July 17, 1956 H. STOVER 2,755,378

STABILIZED DISCRIMINATOR

Filed Sept. 23, 1953

INVENTOR.
HARRIS STOVER
BY Morris Moody
ATTORNEY

United States Patent Office 2,755,378

Patented July 17, 1956

2,755,378

STABILIZED DISCRIMINATOR

Harris Stover, Cedar Rapids, Iowa, assignor to Collins Radio Company, Cedar Rapids, Iowa, a corporation of Iowa Application September 23, 1953, Serial No. 381,895

4 Claims. (Cl. 250—27)

This invention relates generally to discriminators used for frequency and phase demodulation and relates particularly to a stabilized discriminator which is tuned by a single variable element.

A discriminator is defined herein as a circuit which provides a direct current output that is proportional to the frequency variation of an alternating current input.

Discriminators are generally used to detect frequency and phase modulated signals. They are also used to stabilize the frequency of oscillators.

The invention described herein is particularly advantageous when used as a frequency stabilizing means.

Conventional discriminators generally have two input tank circuits. Tuning them over a frequency range presents a tracking problem.

Perfect tracking is essential for very fine selectivity in the conventional circuit. However, perfect tracking requires exact alignment of apparatus which is extraordinarily difficult to obtain, hard to maintain, and therefore very expensive in both regards.

It is therefore an object of this invention to provide a discriminator circuit which does not present a tracking problem during tuning.

It is another object of this invention to provide a discriminator circuit which has only a single tank circuit and therefore may be tuned by a single variable element.

It is yet another object of this invention to provide a discriminator that has very high frequency sensitivity.

It is still another object of this invention to provide a discriminator circuit which is not detuned by reactance variations in preceding circuits.

Further objects, advantages and features of this invention will be apparent to a person skilled in the art upon further study of the specification and drawings, in which.

This invention generally consists of a series resonant network which has a tunable non-resonant tank circuit. The input signal is connected across the network, and an intermediate network point is connected to a phase inverter. Opposite sides of the inverter are connected to a detector circuit which has its midpoint also connected to the input signal. The detector produces an output voltage that is dependent upon the relative phases of the applied voltages.

Figure 1:
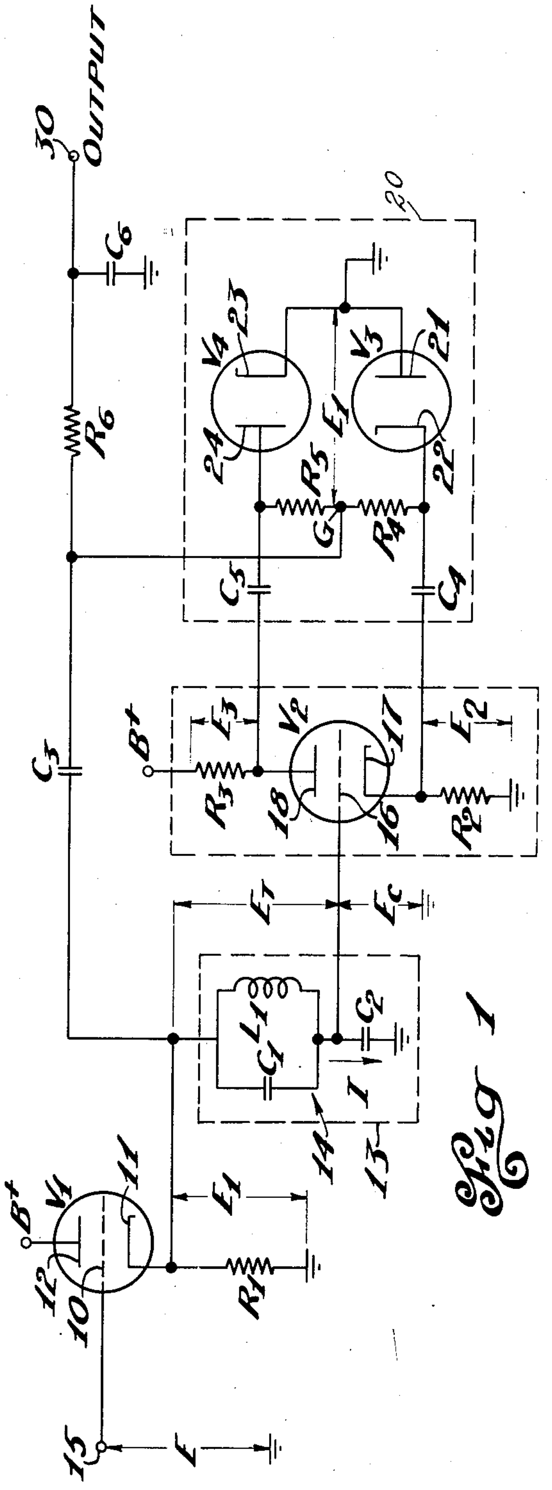
Figure 1 is a schematic diagram of this invention.

A detailed embodiment of the invention is shown in Figure 1. A cathode follower tube $V_1$ has its grid 10 connected to a signal voltage E which is connected to terminal 15. A cathode resistor $R_1$ is connected between the cathode 11 and ground. A B plus power supply is connected to the plate 12 of tube $V_1$.

A phase splitting network 13 is connected in parallel with cathode resistor $R_1$ and consists of a non-resonant tank circuit 14 in series with a capacitor $C_2$. Tank circuit 14 has a first capacitor $C_1$ in parallel with a first inductance coil $L_1$ which is variable.

The ungrounded side of second capacitor $C_2$ is connected to the control grid 16 of a phase inverting tube $V_2$ which has a resistor $R_2$ connected between the cathode 17 and ground and a resistor $R_3$ connected between plate 18 and the B plus power supply. The impedances of resistors $R_2$ and $R_3$ are equal.

One side of a fourth capacitor $C_4$ is connected to the cathode 17 of tube $V_2$, and one side of a fifth capacitor $C_5$ is connected to the plate 18 of tube $V_2$.

The other side of capacitor $C_4$ is connected to a fourth resistor $R_4$ which is in series with a fifth resistor $R_5$ that is connected to the other side of fifth capacitor $C_5$.

A first diode $V_3$ has its plate 21 grounded and its cathode 22 connected to capacitor $C_4$. A second diode $V_4$ has its cathode 23 grounded and its plate 24 connected to capacitor $C_5$.

A blocking capacitor $C_3$ is connected between cathode 11 of tube $V_1$ and the common point G between resistors $R_4$ and $R_5$.

A sixth resistor $R_6$ is connected between capacitor $C_3$ and an output terminal 30, and a sixth capacitor $C_6$ is connected between output terminal 30 and ground. Resistor $R_6$ and capacitor $C_6$ form a low-pass filter network for the output signal.

The invention may be operated at any carrier frequency over a large range by merely adjusting coil $L_1$. If desired, condenser $C_1$ may be adjusted instead of coil $L_1$.

The apparatus is tuned by network 13 to the operating frequency.

Series resonance is obtained when tank circuit 14 is adjusted so that its net inductive reactance equals the capacitive reactance of capacitor $C_2$. Tank circuit 14 is therefore detuned in order to tune series network 13.

Cathode follower $V_1$ provides a voltage $E_1$ across series network 13 which is in phase with the signal voltage E.

It is necessary to understand the phase relations of voltages and currents in this invention to understand its operation. Figures 2 through 7 illustrate various phase relationships in the embodiment of Figure 1.

The following phase relationships always exist whether or not series network 13 is tuned to the input frequency and are common to Figures 2 through 7:

The voltage $E_c$ across capacitor $C_2$ always lags the series current I through network 13 by ninety degrees;

The vectorial sum of capacitor voltage $E_c$ and tank circuit voltage $E_t$ always equals voltage $E_1$; and The phase inverter output voltage $E_2$ is always in phase with voltage $E_c$, and the other phase inverter output voltage $E_3$ is always 180 degrees out of phase with voltage $E_c$.

Voltages $E_1$, $E_2$ and $E_3$ are respectively applied to detector circuit 20, shown in dotted lines, through blocking condensors $C_3$, $C_4$ and $C_5$ to detector circuit 26 at points G, H and K.

Voltages $E_1$ and $E_2$ produce a resultant voltage $E_5$ which causes negative polarity conduction through diode $V_3$; and voltages $E_1$ and $E_3$ produce a resultant voltage $E_6$ which causes positive polarity conduction through diode $V_4$.

When the resultant voltages $E_5$ and $E_6$ have equal magnitudes they induce equal but opposite polarity direct voltages which cancel to provide zero output. However, when the resultant voltages $E_5$ and $E_6$ have unequal magnitudes the direct voltages are unequal and provide a net output.

The direct voltage output of detector 26 varies slowly compared to the signal input frequency and easily passes through the filter comprising resistor $R_6$ and capacitor $C_6$ while the input frequency is shorted to ground.

Figure 2:
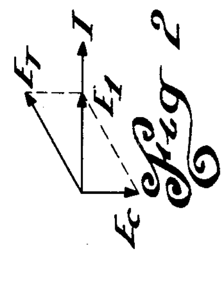
Figure 2 shows the phase relationships in the phase splitting network when the signal is at the resonant frequency of the tank circuit.
Figure 3:
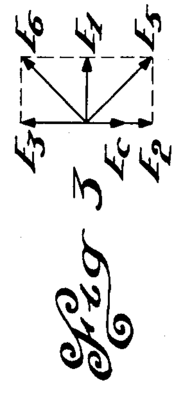
Figure 3 illustrates the phase relationships across the detector circuit when the signal is at the resonant frequency of the tank circuit.

The phase relationships at the series resonant frequency of network 13 are shown in Figures 2 and 3. The series current I is in phase with the input voltage $E_1$; and capacitor voltage $E_c$ is in quadrature with input voltage $E_1$ as shown in Figure 2.

The inverter voltages $E_2$ and $E_3$ are both in quadrature with voltage $E_1$ as shown in Figure 3. The resultant voltages $E_5$ and $E_6$ are therefore equal at series resonance and there is no direct voltage output.

Figure 4:
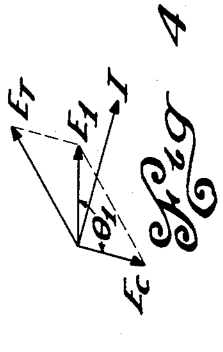
Figure 4 shows the phase relationships in the phase splitting network when the signal frequency is lower than the resonant frequency.
Figure 5:
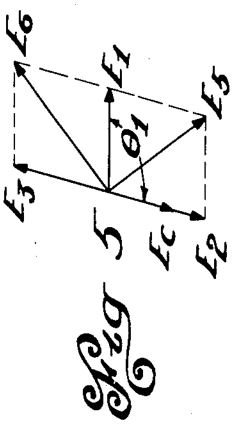
Figure 5 shows the phase relationships across the detector circuit when the signal frequency is lower than the resonant frequency.

The phase relationships at a frequency below series resonance are shown in Figures 4 and 5. The series current I lags voltage $E_1$; and capacitor voltage $E_c$ also lags voltage $E_1$ by an angle $\phi_1$, which is greater than ninety degrees.

The inverter voltages $E_2$ and $E_3$ are no longer in quadrature with voltage $E_1$. This is shown in Figure 5. Resultant voltage $E_6$ is now greater than resultant voltage $E_5$; and the circuit has a direct current output with positive polarity.

Figure 6:
Figure 6 shows the phase relationships in the phase splitting network when the signal frequency is higher than the resonant frequency.
Figure 7:
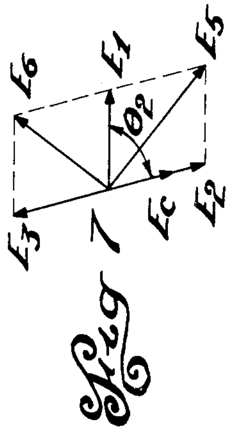
Figure 7 shows the phase relationships across the detector circuit when the signal frequency is higher than resonant frequency.

The phase relationships at a frequenuy above series resonance are shown in Figures 6 and 7. Series current I leads voltage $E_1$; and capacitor voltage $E_c$ lags voltage $E_1$ by an angle $\phi_2$ which is less than ninety degrees.

Resultant voltage $E_5$ is greater than resultant voltage $E_6$; and the circuit has a direct current output with negative polarity.

It is therefore seen that the only frequency sensitive element in this invention is the tank circuit, and that it is tuned by varying a single element. Slug tuning of coil $L_1$ has been found very satisfactory. It is therefore obvious that this circuit presents no tracking problem.

The high impedance input through tube $V_1$ prevents any reactance variation in preceding circuits from effecting the tuned frequency of the discriminator circuit. This invention therefore provides maximum stability and sensitivity for frequency demodulation.

Although this invention has been described with respect to a particular embodiment thereof, it is not to be so limited as changes and modifications may be made therein which are within the full intended scope of this invention, as defined by the appended claims.

I claim:

1. A stabilized discriminator comprising a series resonant circuit having a capacitor connected serially to a tank circuit detuned on its inductive side of resonance, input signal means connected across said series resonant circuit, an electron tube with its control grid connected to an intermediate point on said series resonant circuit located between the detuned tank circuit and capacitor, resistors of equal value connected serially in the cathode and plate circuits of said tube, a pair of blocking capacitors with one connected on one side to the plate of said tube and the other connected on one side of the cathode of said tube, a second pair of resistors having equal values serially connected between the opposite ends of said pair of blocking capacitors, a third blocking capacitor connected at one end to said input signal means, the other end of said third blocking capacitor connected to the common point between the second pair of resistors, a pair of diodes connected with like series polarity across said second pair of resistors, and the intermediate point between said diodes connected to ground, whereby an output is provided between the intermediate point of said diodes and the intermediate point of said second pair of resistors that has an amplitude proportional to the deviation in frequency of the input signal from the tuned frequency of the series resonant circuit.

2. A discriminator circuit having a phase splitting network receiving an incoming signal across it, said phase splitting network comprising a detuned tank circuit with an inductance and a first capacitance connected in parallel and a second condenser connected in series with said tank circuit, an electron tube with its control grid connected to a point on said phase splitting network between the tank circuit and the second condenser, a first pair of resistors having equal value connected in series with the cathode and plate respectively of said electron tube, three direct current blocking means passing alternating current, the first and second blocking means each connected respectively on one side to the cathode and plate of said electron tube, a second pair of resistors having equal value connected in series between the other sides of said first and second blocking means, the third blocking means connected between the incoming signal and the junction between the second pair of resistors, and a pair of asymmetric conductive means connected in series across said second pair of resistors in the direction of maximum conductivity, with the point between said asymmetric conductors connected to ground.

3. A stabilized discriminator comprising, a phase splitting network having a tank circuit and a first condenser in series with one end connected to ground, said tank circuit detuned to series resonate said phase splitting network, a phase reversing electron tube with its control grid connected to the phase splitting network at a point between the first condenser and the tank circuit, a first resistor connected between the cathode of the phase reversing tube and ground, a second resistor equal in value to the first resistor connected between the plate of said tube and its plate supply source, a detector circuit comprising a pair of diodes with the cathode of the first diode and the anode of the second diode connected together and to ground, a second condenser connected between the anode of the first diode and the plate of the phase reversing tube, a third condenser connected between the cathode of the second diode and the cathode of the phase reversing tube, a pair of resistors having equal value connected in series between the plate of the first diode and the cathode of the second diode, and a fourth condenser connected on one side to the junction point between the pair of resistors and on the other side to the ungrounded end of the phase splitting network, whereby a frequency varying signal applied across the phase splitting network provides an amplitude varying signal between the junction point and ground.

4. A stabilized discriminator particularly useful with a high impedance signal source having one side grounded comprising, a phase splitting network connected across said signal source and having a tank circuit and a condenser connected in series, the tank circuit detuned to series resonate the phase splitting network at the center frequency of the signal, an electron tube with its control grid connected to the phase splitting network between the condenser and the tank circuit, a first resistor connected between the cathode of the electron tube and ground, a second resistor that is equal in resistance to the first resistor connected between the plate of the tube and its plate supply source, a detector circuit comprising a pair of diodes connected serially in their direction of maximum conductivity with their intermediate point connected to ground, a first blocking capacitor connected between the plate of the electron tube and one end of the diode circuit, a second blocking condenser connected between the cathode of the electron tube and the other end of said diode circuit, a second pair of resistors having equal value connected in series across said diode circuit, and a third blocking condenser connected between the ungrounded side of the signal source and the junction between said second pair of resistors, whereby the output of the circuit is not affected by variations in the transconductance of the electron tube.

References Cited in the file of this patent

UNITED STATES PATENTS

| | | |
|---|---|---|
| 2,265,744 | Rath | Dec. 9, 1941 |
| 2,505,368 | Shenk | Apr. 25, 1950 |